(12) United States Patent
Tsutsumi et al.

(10) Patent No.: US 8,561,408 B2
(45) Date of Patent: Oct. 22, 2013

(54) HYDROGEN PRODUCTION SYSTEM AND POWER GENERATION SYSTEM

(75) Inventors: Takanori Tsutsumi, Nagasaki (JP); Yoshinori Koyama, Nagasaki (JP); Katsuhiro Ota, Tokyo (JP); Takashi Fujii, Tokyo (JP); Takashi Yamamoto, Nagasaki (JP); Hiromi Ishii, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 99 days.

(21) Appl. No.: 13/058,150

(22) PCT Filed: Dec. 10, 2009

(86) PCT No.: PCT/JP2009/070660
§ 371 (c)(1),
(2), (4) Date: Apr. 5, 2011

(87) PCT Pub. No.: WO2010/067836
PCT Pub. Date: Jun. 17, 2010

(65) Prior Publication Data
US 2011/0314814 A1    Dec. 29, 2011

(30) Foreign Application Priority Data

Dec. 12, 2008    (JP) .................................. 2008-317198

(51) Int. Cl.
*F01K 27/00*    (2006.01)
*B01J 8/00*    (2006.01)
*B01J 8/02*    (2006.01)

(52) U.S. Cl.
USPC ................ 60/643; 60/670; 422/625; 422/211

(58) Field of Classification Search
USPC ............ 60/643, 645, 653, 673, 670; 422/600, 422/625–631, 211; 48/61, 197 R
See application file for complete search history.

(56) References Cited

U.S. PATENT DOCUMENTS 2,747,967 A    5/1956    Markert et al.
3,441,393 A *  4/1969    Multhaup et al. ............. 423/359
(Continued)

FOREIGN PATENT DOCUMENTS

CN    1396887 A    2/2003
CN    1759164 A    4/2006
(Continued)

OTHER PUBLICATIONS

Chinese Office Action issued in Chinese Patent Application No. 200980131966.6 on Jun. 6, 2013.
Korean Decision to Grant a Patent issued in Korean Patent Application No. 10-2011-7003036 on Jun. 3, 2013.

*Primary Examiner* — Thomas Denion
*Assistant Examiner* — Laert Dounis
(74) *Attorney, Agent, or Firm* — Birch, Stewart, Kolasch & Birch, LLP

(57) ABSTRACT

The amount of high-temperature steam supplied from external equipment is reduced. Provided is a hydrogen production system (1) including a reactor (3) that allows a humidified process fluid output from a humidifier (2) to react in the presence of a catalyst to transform carbon monoxide in the process fluid into carbon dioxide; a second channel (B) through which the high-temperature process fluid that has reacted in the reactor (3) flows; a circulation channel (C) through which excess water in the humidifier (2) is circulated; and a first heat exchanger (7), disposed at an intersection of the circulation channel (C) and the second channel (B), for heat exchange between the high-temperature process fluid that has reacted in the reactor (3) and the fluid circulated through the circulation channel (C).

13 Claims, 6 Drawing Sheets

(56) References Cited

U.S. PATENT DOCUMENTS

| | | | |
|---|---|---|---|
| 4,062,673 | A | 12/1977 | Roberts |
| 4,351,742 | A | 9/1982 | Deuser et al. |
| 4,476,683 | A * | 10/1984 | Shah et al. ............... 60/648 |
| 4,487,139 | A * | 12/1984 | Warner ................... 110/345 |
| 5,358,696 | A | 10/1994 | Jahnke |
| 6,863,879 | B2 * | 3/2005 | Rojey et al. ............. 423/651 |
| 2002/0004533 | A1 | 1/2002 | Wallace et al. |
| 2006/0236697 | A1 | 10/2006 | Rao et al. |

FOREIGN PATENT DOCUMENTS

| | | |
|---|---|---|
| DE | 10227709 A1 * | 2/2003 |
| EP | 0 217 505 A2 | 7/1986 |
| EP | 0 321 739 A2 | 6/1989 |
| JP | 1-188403 A | 7/1989 |
| JP | 9-502694 A | 3/1997 |
| JP | 2003-521576 A | 7/2003 |

* cited by examiner

HYDROGEN PRODUCTION SYSTEM AND POWER GENERATION SYSTEM

TECHNICAL FIELD

The present invention relates to hydrogen production systems and power generation systems that convert carbon monoxide contained in gas from upstream equipment utilizing coal, natural gas, oil, etc. into hydrogen.

BACKGROUND ART

For example, in IGCC (Integrated Gasification Combined Cycle) with $CO_2$ capture, as shown in FIG. 7, coal gas produced by gasification in a gasifier 101 is desulfurized in desulfurization equipment 102 and is then fed to hydrogen production equipment 103. This hydrogen production equipment 103 allows the coal gas to react with steam in the presence of a catalyst to transform carbon monoxide contained in the coal gas into carbon dioxide, thus producing hydrogen-rich coal gas. The coal gas after the shift reaction is fed to carbon dioxide capture equipment 104 to capture carbon dioxide from the gas, and the hydrogen-enriched purified gas is fed to power generation equipment 105. In the power generation equipment 105, the purified gas is fed to a combustor of a gas turbine and is used to power the gas turbine.

In the above hydrogen production equipment 103, carbon monoxide (CO) contained in the coal gas is converted into carbon dioxide by adding steam as a shift catalyst. This reaction formula is as represented by formula (I) below:

{Math. 1}

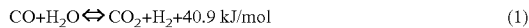

$$CO + H_2O \Leftrightarrow CO_2 + H_2 + 40.9 \text{ kJ/mol} \quad (1)$$

Because the shift reaction can be increasingly promoted as a larger amount of steam serving as a shift catalyst is added, the hydrogen production equipment 103 is preferably supplied with an amount of steam sufficient to eliminate carbon monoxide.

CITATION LIST

Patent Literature

{PTL 1}
Japanese Translation of PCT International Application, Publication No. HEI-9-502694

SUMMARY OF INVENTION

Technical Problem

The source of the steam described above is, for example, steam used for driving a steam turbine in the power generation equipment. However, if much steam is supplied to the shift reaction equipment to promote the shift reaction, the amount of steam used for driving the steam turbine is correspondingly decreased, and the output of the steam turbine is decreased, thus decreasing the total power generation output (power generation efficiency) of the IGCC.

The above problem is not limited to the IGCC described above; for example, it has been widely noted in equipment requiring a reaction that eliminates carbon monoxide from gas containing hydrocarbon compounds, and there has been demand for a technique capable of reducing the amount of steam extracted from external equipment without decreasing the reaction efficiency of carbon monoxide.

An object of the present invention, which has been made to solve the above problem, is to provide a hydrogen production system and power generation system with a reduced amount of high-temperature steam supplied from external equipment.

Solution to Problem

To solve the above problem, the present invention employs the following solutions.

An aspect of the present invention is a hydrogen production system including a humidifier that is supplied with a process fluid containing carbon monoxide and that mixes the process fluid with steam; a reactor that allows the humidified process fluid output from the humidifier to react in the presence of a catalyst to transform the carbon monoxide in the process fluid into carbon dioxide; a first channel through which the humidified process fluid is supplied from the humidifier to the reactor; a second channel through which the high-temperature process fluid that has reacted in the reactor flows; a circulation channel through which excess water in the humidifier is circulated; and a first heat exchanger, disposed at an intersection of the circulation channel and the second channel, for heat exchange between the high-temperature process fluid that has reacted in the reactor and the fluid circulated through the circulation channel.

According to the above aspect, the process fluid mixed with steam in the humidifier is fed to the reactor through the first channel. The reactor allows the process fluid to react in the presence of a catalyst to transform the carbon monoxide in the process fluid into carbon dioxide, thereby increasing the amount of hydrogen contained in the process fluid. The reaction also produces reaction heat. After the reaction, the high-temperature hydrogen-rich process fluid is output to the second channel.

On the other hand, excess steam unmixed with the process fluid in the humidifier is, for example, cooled, turning into water, and is then returned to the humidifier through the circulation channel In this case, because the first heat exchanger is disposed at the intersection of the circulation channel and the second channel for heat exchange between the high-temperature process fluid and the fluid circulated through the circulation channel, the fluid circulated through the circulation channel is heated with heat from the process fluid and is returned to the humidifier as a high-temperature fluid. Thus, according to the present invention, because excess steam (water) in the humidifier is circulated and is heated to high temperature by means of the reaction heat from the reactor, the steam used in the humidifier can be supplied from the same system. This significantly reduces the amount of steam supplied from another system.

The above hydrogen production system may further include a first bypass channel branched off the circulation channel so as to bypass the first heat exchanger and a first flow control valve disposed in the first bypass channel to control the flow rate of the fluid fed to the first heat exchanger.

In this way, because the first bypass channel is disposed on the circulation channel so as to bypass the first heat exchanger, a portion of the fluid fed to the first heat exchanger can be made to bypass the first heat exchanger. In addition, because the first flow control valve is disposed in the first bypass channel, the first flow control valve can be controlled to an appropriate degree of opening to control the flow rate of the fluid fed to the first heat exchanger to an appropriate rate. This allows the temperature of the fluid to be controlled to an appropriate temperature, thus controlling the temperature of the fluid returned to the humidifier to an appropriate temperature.

The above hydrogen production system may further include a second heat exchanger, disposed at an intersection of the first channel and the second channel, for heat exchange between the process fluid from the humidifier and the high-temperature reacted process fluid output from the reactor.

With this configuration, the temperature of the process fluid fed to the reactor can be raised through the second heat exchanger by heat exchange between the process fluid fed from the humidifier to the reactor and the high-temperature process fluid output from the reactor, thus approaching the temperature conditions appropriate for the reaction.

The above hydrogen production system may further include a second bypass channel branched off the second channel so as to bypass the second heat exchanger and a second flow control valve disposed in the second bypass channel to control the flow rate of the high-temperature reacted process fluid fed to the second heat exchanger.

With this configuration, the second flow control valve disposed in the second bypass channel can be controlled to an appropriate degree of opening to control the flow rate of the high-temperature process fluid fed to the second heat exchanger to an appropriate rate. This allows the level of heat exchange in the second heat exchanger to be controlled, thus controlling the temperature of the process fluid fed to the reactor to a temperature appropriate for the reaction.

The above hydrogen production system may further include a third channel through which makeup water is supplied to the humidifier and a third heat exchanger, disposed at an intersection of the third channel and the second channel, for heat exchange between the high-temperature reacted process fluid and the makeup water flowing through the third channel.

With this configuration, the makeup water flowing through the third channel is heated through the third heat exchanger by heat exchange with the high-temperature process fluid and is then supplied to the humidifier. This allows makeup water (steam) at a temperature appropriate for the temperature atmosphere in the humidifier to be supplied to the humidifier, thus maintaining a sufficient amount of steam in the humidifier.

In the above hydrogen production system, the third channel and the second channel may intersect at a plurality of positions, and the heat exchanger may be disposed at each intersection.

In this way, if the third channel and the second channel intersect at a plurality of positions and the heat exchanger is disposed at each intersection, the makeup water flowing through the third channel can be gradually heated to high temperature so that some or all of it can be turned into steam.

The above hydrogen production system may further include a separator disposed in the third channel to separate the fluid flowing through the third channel into water and steam and a fourth channel through which the steam separated by the separator is supplied to the first channel.

With this configuration, the makeup water flowing through the third channel is separated into water and steam by the separator, and the separated steam is supplied to the first channel through the fourth channel. This allows more steam to be given to the process fluid flowing through the first channel.

The above hydrogen production system may further include a third flow control valve disposed in the fourth channel to control the flow rate of the steam supplied to the first channel.

This allows the amount of steam supplied to the first channel to be controlled to an appropriate amount.

The above hydrogen production system may further include a fourth heat exchanger disposed in the fourth channel to heat the steam flowing through the fourth channel with heat generated in the reactor.

With this configuration, the steam flowing through the fourth channel can be mixed into the first channel after the temperature thereof is raised. The steam flowing through the fourth channel removes reaction heat from the reactor to decrease the temperature in the reactor, thus promoting the reaction.

The above hydrogen production system may further include a fifth channel branched off the fourth channel to supply a portion of the steam flowing through the fourth channel to the humidifier.

With this configuration, steam can also be supplied from the fifth channel to the humidifier.

The above hydrogen production system may further include a fourth flow control valve disposed in the fifth channel to control the amount of steam supplied to the humidifier.

The fourth flow control valve allows the amount of steam supplied from the fifth channel to the humidifier to be controlled.

In the above hydrogen production system, the degree of opening of the first flow control valve and the degree of opening of the fourth flow control valve may be controlled on the basis of an atmospheric temperature in the humidifier.

The atmospheric temperature in the humidifier is preferably maintained at a temperature appropriate for the mixing of the steam and the process fluid. As the degree of opening of the first flow control valve approaches a fully close state, a larger amount of fluid flows into the first heat exchanger so that the temperature of the fluid can be raised, and this fluid can be supplied to the humidifier to raise the temperature in the humidifier. As the degree of opening of the fourth flow control valve approaches a fully open state, a larger amount of steam can be supplied to the humidifier through the fifth channel. Here, because the steam flowing through the fifth channel is heated to high temperature by reaction heat from the reactor, this high-temperature steam can be supplied to the humidifier to raise the temperature in the humidifier.

In this way, the degrees of opening of the first flow control valve and the fourth flow control valve can be controlled to maintain the atmospheric temperature in the humidifier at an appropriate value.

In the above hydrogen production system, the degree of opening of the fourth flow control valve may be increased until the temperature in the humidifier reaches a saturation temperature if the temperature in the humidifier does not reach the saturation temperature after the first flow control valve is fully closed in a state that the fourth flow control valve fully closed.

In this way, with priority given to raising the temperature of the fluid circulated through the circulation channel, the fourth flow control valve is gradually opened to supply the high-temperature steam from the fifth channel to the humidifier if even the steam supplied from the circulation channel does not allow the atmospheric temperature in the humidifier to reach the saturation temperature. Such prioritization minimizes the amount of steam supplied through the fifth channel. This avoids a decrease in the amount of steam supplied through the fourth channel.

The above hydrogen production system may further include a discharge channel branched off the circulation channel to release a portion of the fluid flowing through the circulation channel to the outside.

As the fluid is repeatedly used by circulating it through the circulation channel, the amount of impurities contained in the fluid increases gradually. In such a case, if the discharge channel is provided, soiled fluid can be discharged, so that the amount of impurities contained in the fluid can be reduced.

An aspect of the present invention is a power generation system including one of the above hydrogen production systems.

The above power generation system may further include a steam turbine and a sixth channel through which a portion of high-pressure or medium-pressure steam supplied to the steam turbine is supplied to the first channel.

Advantageous Effects of Invention

The present invention provides the advantage of reducing the amount of high-temperature steam supplied from external equipment.

DETAILED DESCRIPTION OF THE INVENTION

{Description Of Embodiments}

Figure 7:
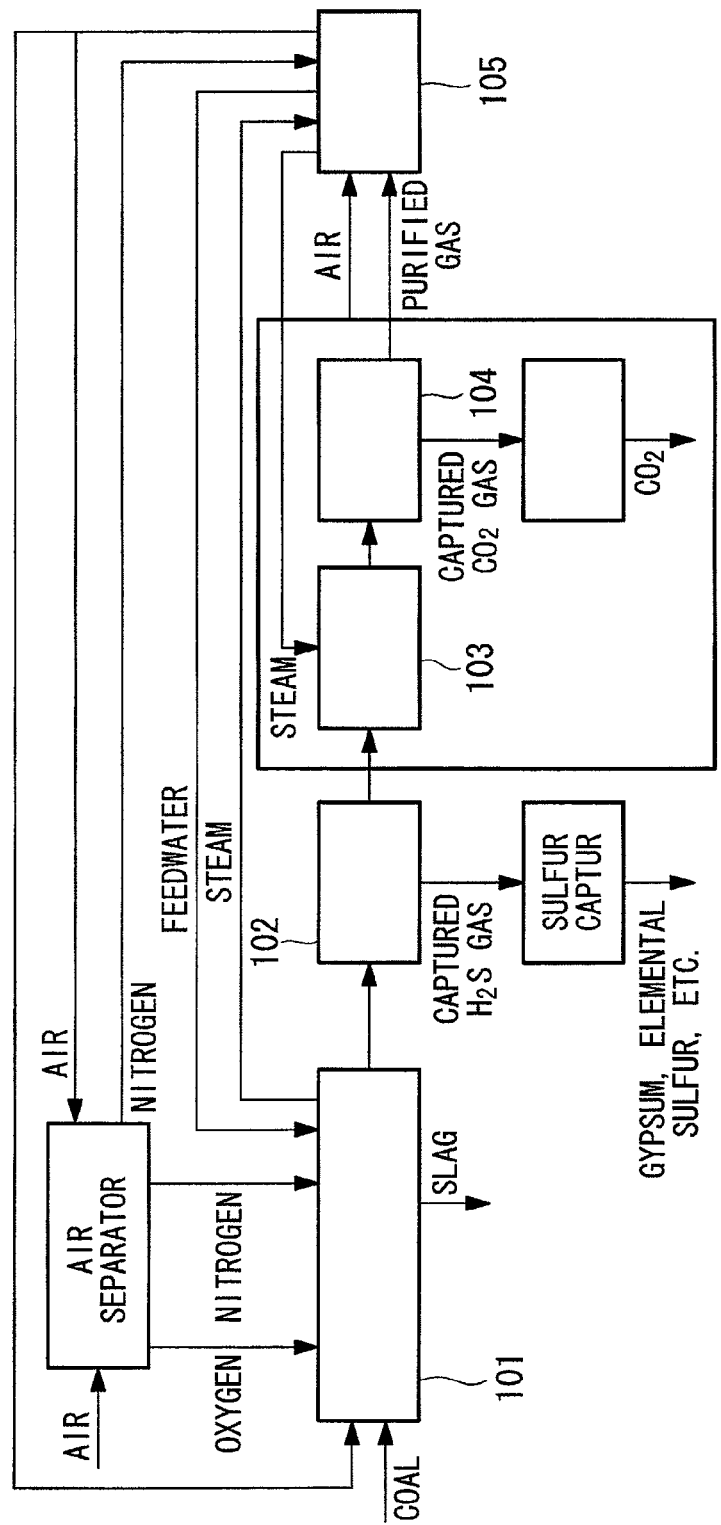
FIG. 7 is a schematic configuration diagram showing the overall configuration of typical IGCC with $CO_2$ capture.

An embodiment of a hydrogen production system and power generation system according to the present invention will be described below with reference to the drawings. The hydrogen production system according to this embodiment is widely applied, for example, to plants requiring equipment requiring a reaction that eliminates carbon monoxide from gas containing hydrocarbon compounds, and is particularly suitable for use as hydrogen production equipment in IGCC with $CO_2$ capture, as shown in FIG. 7.

{First Embodiment}

Figure 1:
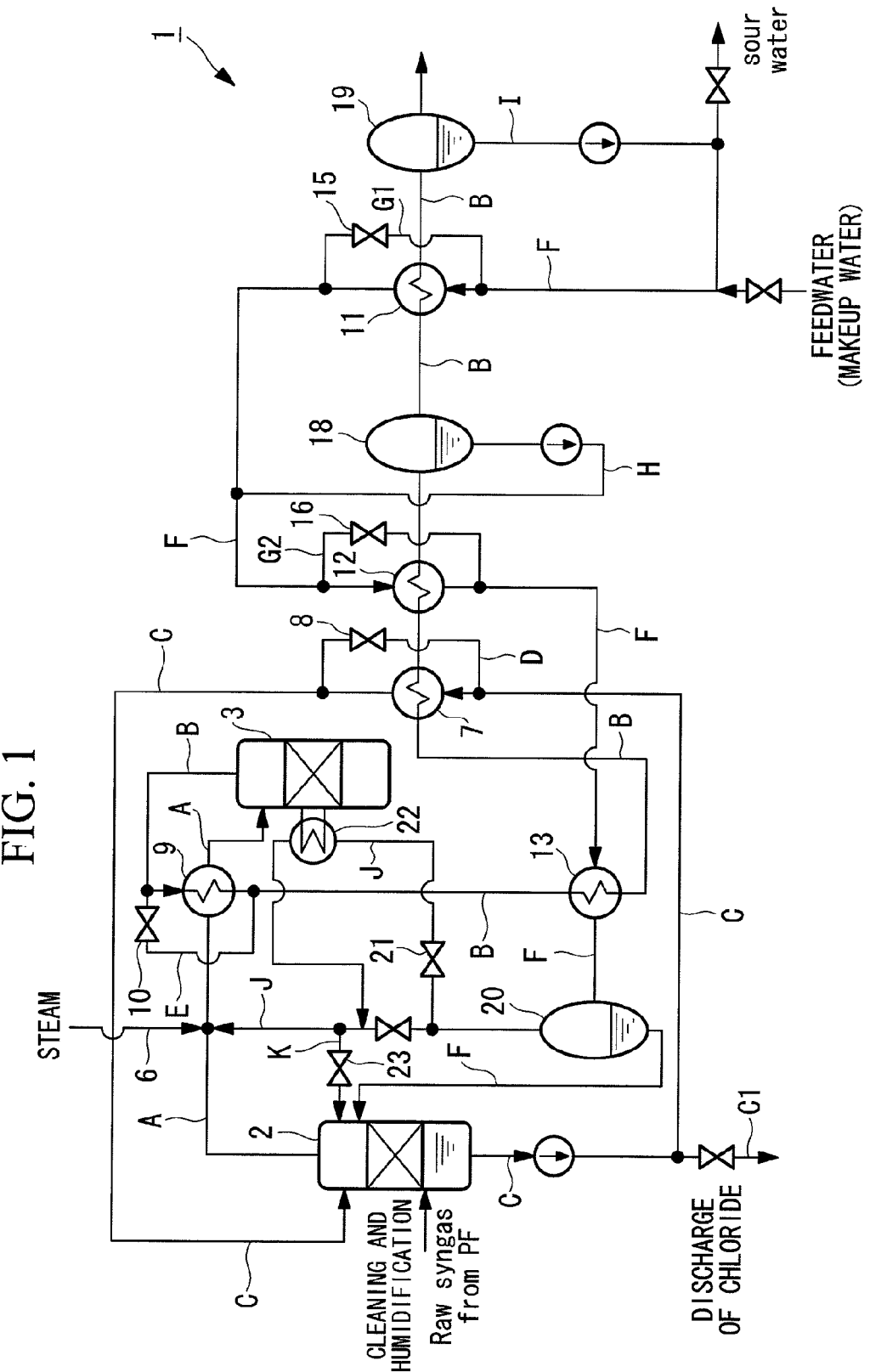
FIG. 1 is a diagram schematically showing the configuration of a hydrogen production system according to a first embodiment of the present invention.

FIG. 1 is a diagram schematically showing the configuration of a hydrogen production system according to a first embodiment of the present invention.

As shown in FIG. 1, a hydrogen production system 1 according to this embodiment includes a humidifier 2 that is supplied with a process fluid containing carbon monoxide and that mixes the process fluid with steam and a reactor 3 that allows the humidified process fluid output from the humidifier 2 to react in the presence of a catalyst to transform the carbon monoxide in the process fluid into carbon dioxide.

The humidifier 2 and the reactor 3 are connected with a first channel A so that the process fluid humidified by the humidifier 2 is supplied to the reactor 3 through the first channel A.

The high-temperature process fluid that has reacted in the reactor 3 is output to a second channel B.

The humidifier 2 is provided with a circulation channel C through which drain water, that is, excess water unmixed with the process fluid, is circulated.

Disposed at an intersection of the circulation channel C and the second channel B is a first heat exchanger 7 for heat exchange between the high-temperature process fluid that has reacted in the reactor 3 and the fluid circulated through the circulation channel C.

The circulation channel C is provided with a first bypass channel D branched off the circulation channel C upstream of the first heat exchanger 7 so as to bypass the first heat exchanger 7. This first bypass channel D is provided with a first flow control valve 8 for controlling the flow rate of the fluid fed to the first heat exchanger 7.

The circulation channel C is provided with a discharge channel C1 branched off the circulation channel C to release a portion of the drain water flowing through the circulation channel C to the outside. This discharge channel C1 is provided with a control valve for controlling the amount of drain water discharged to the outside.

Disposed at an intersection of the first channel A and the second channel B is a second heat exchanger 9 for heat exchange between the process fluid from the humidifier 2 and the high-temperature reacted process fluid output from the reactor 3.

The second channel B is provided with a second bypass channel E branched off the second channel B upstream of the second heat exchanger 9 so as to bypass the second heat exchanger 9. This second bypass channel E is provided with a second flow control valve 10 for controlling the flow rate of the high-temperature reacted process fluid fed to the second heat exchanger 9.

The hydrogen production system 1 includes a third channel F through which makeup water is supplied to the humidifier 2. This third channel F is formed so as to intersect the second channel B at one or more positions, preferably at a plurality of positions. FIG. 1 illustrates the case where they intersect at three positions.

Disposed at intersections of the second channel B and the third channel F are three third heat exchangers 11, 12, and 13 for heat exchange between the high-temperature reacted process fluid flowing through the second channel B and the makeup water flowing through the third channel F.

The third channel F is provided with third bypass channels G1 and G2 branched off the third channel F upstream of the third heat exchangers 11 and 12, respectively, so as to bypass the third heat exchangers 11 and 12. The third bypass channels G1 and G2 have third flow control valves 15 and 16, respectively, for controlling the flow rate of the makeup water fed to the third heat exchangers 11 and 12.

The process fluid flowing through the second channel B is cooled by heat exchange with the fluid flowing through the circulation channel C, the makeup water flowing through the third channel F, etc. so that the steam in the process fluid turns into water, thus producing water. To recover the water contained in the process fluid, the second channel B is provided with at least one vapor-liquid separator. FIG. 1 illustrates two vapor-liquid separators 18 and 19.

The water recovered by the vapor-liquid separators 18 and 19 is supplied through pipes H and I to the third channel F through which the makeup water flows.

The third channel F is provided with a vapor-liquid separator 20 downstream of the most-downstream third heat exchanger 13 to separate the fluid flowing through the third channel F into a vapor phase and a liquid phase. In addition, a fourth channel J is connected to the vapor-liquid separator 20 to supply the steam separated by the vapor-liquid separator 20 to the first channel A.

The fourth channel J is provided with a third flow control valve 21 for controlling the flow rate of the steam supplied to the first channel A. In addition, the fourth channel J is provided with a fourth heat exchanger 22 for heating the steam flowing through the fourth channel J with heat generated in the reactor 3.

A steam supply pipe 6 for supplying steam from another system is connected to the first channel A. The source of the steam is, for example, steam used for driving a steam turbine in IGCC. If the system experiences a shortage of steam, for example, as described later, if the amount of steam is insufficient even after steam is supplied from the fourth channel J etc., the steam supply pipe 6 is used to compensate for the shortage of steam.

The fourth channel J is provided with a fifth channel K branched off the fourth channel J to supply a portion of the steam flowing through the fourth channel J to the humidifier 2. This fifth channel K is provided with a fourth flow control valve 23 for controlling the amount of steam supplied to the humidifier 2.

In the hydrogen production system described above, a process fluid containing carbon monoxide is supplied to the humidifier 2 and is mixed with steam in the humidifier 2 while being heated to the saturation temperature. The process fluid mixed with steam in the humidifier 2 is fed to the reactor 3 through the first channel A. The reactor 3 allows the process fluid to react by catalyzation to transform the carbon monoxide in the process fluid into carbon dioxide, thereby increasing the amount of hydrogen contained in the process fluid. The reaction also produces reaction heat. The formula of this reaction is as shown in formula (I) above.

After the reaction, the hydrogen-enriched high-temperature process fluid is output to the second channel B.

The high-temperature process fluid released into the second channel B is fed to the second heat exchanger 9 for heat exchange with the unreacted process fluid flowing through the first channel A. At this time, the flow rate of the reacted process fluid fed to the second heat exchanger 9 is controlled with the degree of opening of the second flow control valve 10. The degree of opening of the second flow control valve 10 can be controlled depending on the temperature of the unreacted process fluid flowing through the first channel A to control the temperature of the unreacted process fluid fed to the reactor 3 to a value appropriate for the reaction. In this way, the inlet temperature of the reactor 3 can be optimized to promote the reaction in the reactor 3.

The reacted process fluid after the heat exchange in the second heat exchanger 9 flows through the second channel B and is fed to the third heat exchanger 13. The process fluid is further cooled through the third heat exchanger 13 by heat exchange with the makeup water flowing through the third channel F. The process fluid then flows through the second channel B and is fed to the first heat exchanger 7.

The first heat exchanger 7 is supplied, through the circulation channel C, with drain water formed as excess steam unmixed with the process fluid in the humidifier 2 is cooled. The drain water flowing through the circulation channel C is heated to high temperature through the first heat exchanger 7 by heat exchange with the high-temperature process fluid flowing through the second channel B and is then returned to the humidifier 2 through the circulation channel C, whereas the process fluid deprived of heat by heat exchange flows through the second channel B and is fed to the third heat exchanger 12.

In this case, the flow rate of the drain water fed to the first heat exchanger 7 is controlled with the degree of opening of the first flow control valve 8 provided in the first bypass channel D. The degree of opening of the first flow control valve 8 can be controlled depending on the atmospheric temperature in the humidifier 2 to control the temperature of the drain water fed to the humidifier 2 to a value appropriate for the atmospheric temperature in the humidifier 2 (for example, the saturation temperature). This allows the atmospheric temperature in the humidifier 2 to be maintained at the optimum value.

The process fluid fed to the third heat exchanger 12 is further cooled by heat exchange with the makeup water flowing through the third channel F and is then fed to the vapor-liquid separator 18. The vapor-liquid separator 18 recovers water from the process fluid, the water being supplied to the third channel F through the pipe H. After the recovery of water in the vapor-liquid separator 18, the process fluid is fed to the third heat exchanger 11 for heat exchange with the makeup water again. The process fluid after the heat exchange is fed to the vapor-liquid separator 19, which recovers water therefrom, and is then supplied to other equipment provided downstream.

On the other hand, the makeup water flowing through the third channel F, as described above, is gradually heated through the third heat exchangers 11, 12, and 13 by heat exchange with the process fluid and is fed to the vapor-liquid separator 20, partially in the form of steam.

The vapor-liquid separator 20 separates steam from water, and the makeup water is supplied to the humidifier 2 through the third channel F. The steam, on the other hand, flows through the fourth channel J and is fed to the fourth heat exchanger 22. In the fourth heat exchanger 22, the steam flowing through the fourth channel J is heated by reaction heat generated in the reactor 3.

Figure 2:
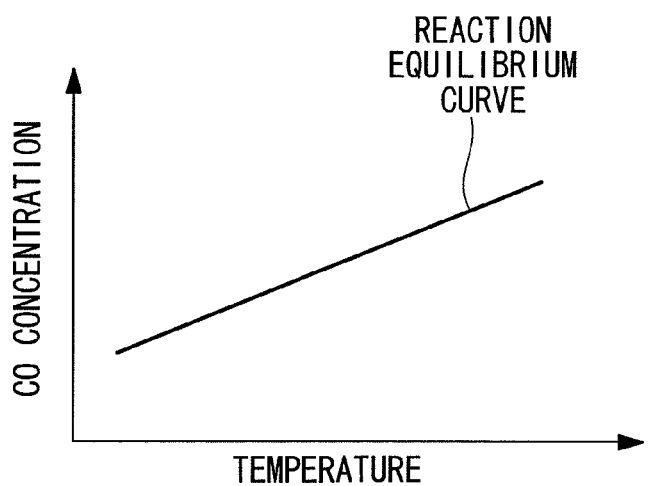
FIG. 2 is a graph showing an equilibrium curve of the relationship between carbon monoxide concentration and temperature in a reactor.

This consumes the heat generated in the reactor 3 during the reaction, thus lowering the atmospheric temperature in the reactor 3. The carbon monoxide concentration and the temperature in the reactor 3 correlate as shown in FIG. 2. That is, as the temperature is reduced, more carbon monoxide contained in the process fluid can be transformed into carbon dioxide, so that the amount of carbon monoxide in the process fluid can be reduced. Thus, the temperature rise in the reactor 3 can be suppressed to promote the reaction in the reactor 3.

A portion of the steam heated to high temperature by the heat generated during the reaction is supplied to the humidifier 2 through the fifth channel K, whereas the remainder is mixed, through the fourth channel J, into the process fluid flowing through the first channel A. Here, the flow rate of the steam supplied to the humidifier 2 through the fifth channel K is controlled with the degree of opening of the fourth flow control valve 23 provided in the fifth channel K.

Here, the atmospheric temperature in the humidifier 2 is preferably maintained at a value appropriate for the mixing of the process fluid and the steam. The atmospheric temperature in the humidifier 2, as described above, is controlled by controlling the degree of opening of the first flow control valve 8 provided in the first bypass channel D of the circulation channel C, although it may be impossible to maintain the atmospheric temperature in the humidifier 2 at an appropriate value because of a shortage of heat even after the first flow control valve 8 is fully closed to supply all drain water flowing through the circulation channel C to the first heat exchanger 7.

Even in such a case, the fifth channel K provides a route for supplying the high-temperature steam flowing through the fourth channel J to the humidifier 2 to eliminate the shortage of heat.

Figure 3:
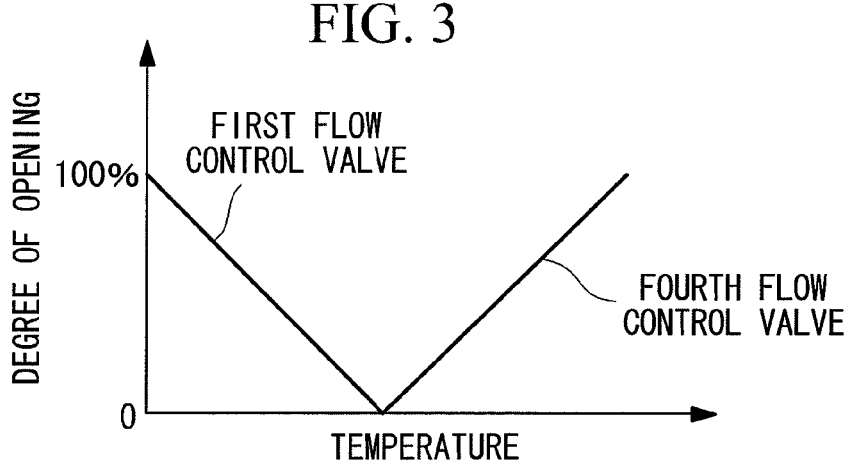
FIG. 3 is a graph showing control of the degrees of opening of a first flow control valve and a fourth flow control valve.

The degree of opening of the first flow control valve 8 and the degree of opening of the fourth flow control valve 23 are controlled, for example, as shown in FIG. 3. Specifically, if the humidifier 2 does not require a large amount of heat, the degree of opening of the first flow control valve 8 is controlled with the fourth flow control valve 23 fully closed. On the other hand, if the amount of heat is insufficient after the first flow control valve 8 is fully closed to supply all drain water flowing through the circulation channel C to the first heat exchanger 7, the degree of opening of the fourth flow control valve 23 is controlled to supply the high-temperature steam from the fifth channel to the humidifier 2, thereby supplementing the amount of heat in the humidifier 2.

As described above, because the hydrogen production system 1 according to this embodiment includes the circulation channel C for cooling excess steam from the humidifier 2 and circulating it as drain water and the first heat exchanger 7 for heating the drain water circulated through the circulation channel C with heat from the reacted process fluid, the steam used in the humidifier 2 can be supplied from the same system. This significantly reduces the amount of steam supplied from another system. As a result, for example, when applied to IGCC with $CO_2$ capture, as shown in FIG. 7, the hydrogen production system 1 does not have to be supplied with high-pressure steam used for driving a steam turbine in power generation equipment (or the amount supplied can be significantly reduced), thus suppressing the decrease in the power generation efficiency of the steam turbine.

As described above, if the amount of heat or the flow rate of steam may still be insufficient after drain water is supplied from the third channel F to the humidifier 2, high-temperature steam is supplied from the fourth channel J to the first channel A, and high-temperature steam is supplied from the fifth channel K to the humidifier 2, high-pressure steam (for example, high-pressure steam used for driving a steam turbine) may be supplied from the steam supply pipe 6 to the first channel A.

{First Modification}

Figure 4:
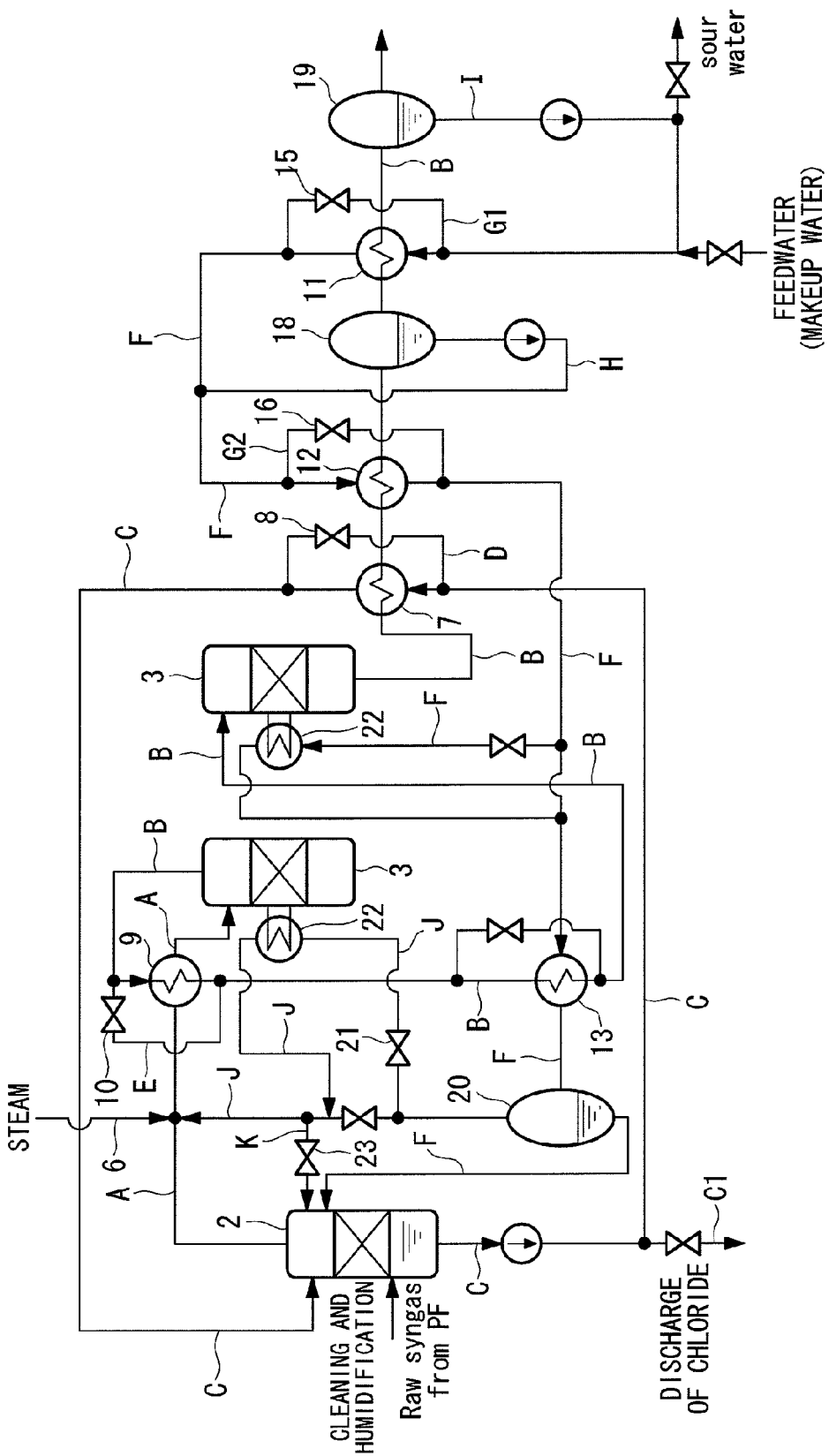
FIG. 4 is a diagram schematically showing the configuration of a hydrogen production system according to a first modification of the present invention.

Whereas the first embodiment described above illustrates the case where only one reactor 3 is provided, for example, as shown in FIG. 4, a plurality of reactors 3 may be provided. In this case, the reacted process fluid reacted in the reactor 3 disposed upstream is sequentially supplied to the reactor 3 disposed on the downstream side.

In this way, a plurality of reactors 3 can be provided to further reduce the amount of carbon monoxide in the process fluid.

If two or more reactors 3 are provided in this way, reaction heat generated in each reactor 3 may be subjected to heat exchange with a different fluid. For example, as shown in FIG. 4, the reaction heat from the reactor 3 disposed upstream is subjected to heat exchange with the steam flowing through the fourth channel J, whereas the reaction heat from the reactor 3 disposed downstream is subjected to heat exchange with the makeup water flowing through the third channel F.

{Second Modification}

Figure 5:
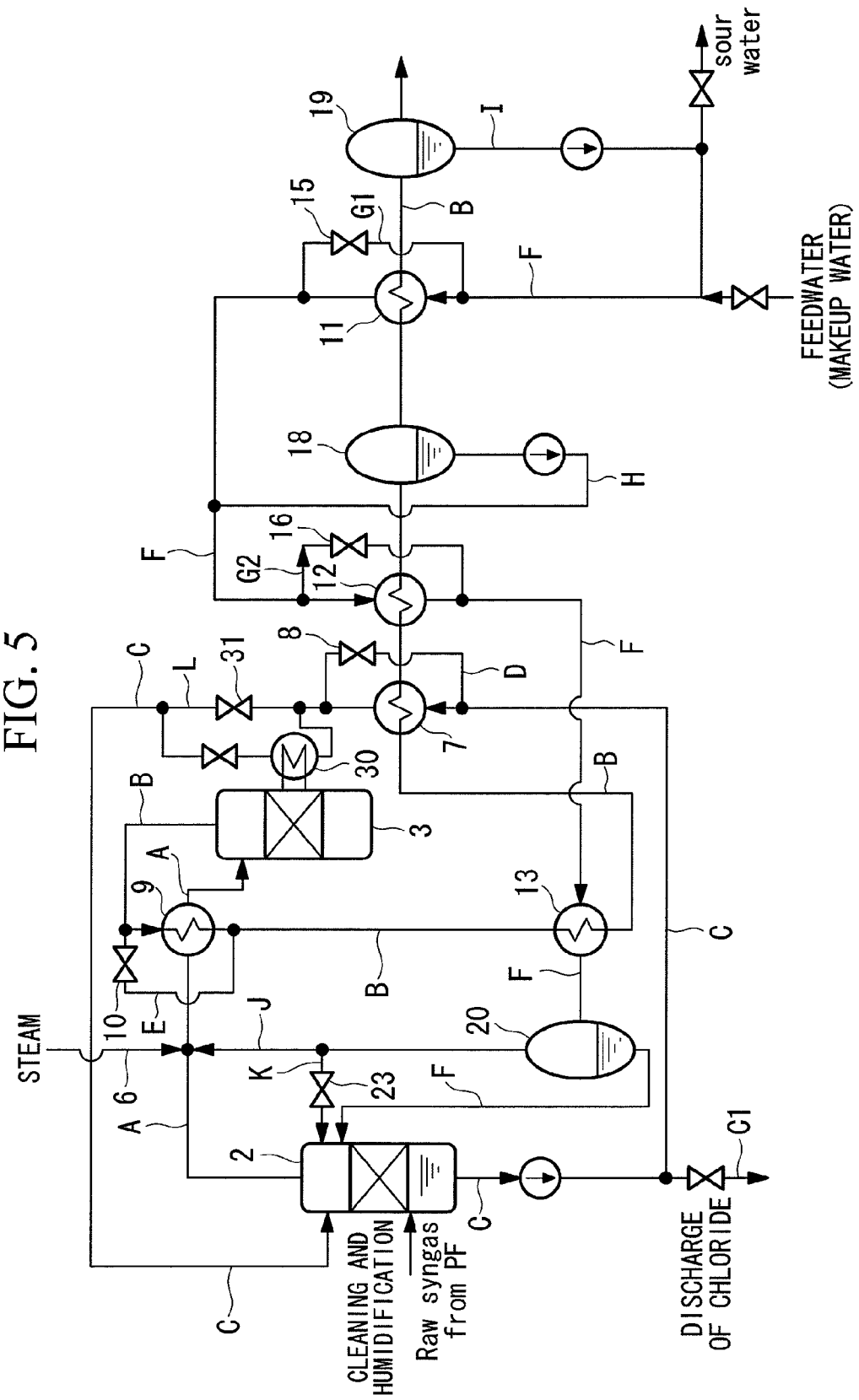
FIG. 5 is a diagram schematically showing the configuration of a hydrogen production system according to a second modification of the present invention.

Whereas the temperature rise in the reactor 3 is suppressed by heat exchange between the reaction heat from the reactor 3 and the steam flowing through the fourth channel J in the first embodiment described above, as shown in FIG. 5, it may instead be possible to provide a fifth heat exchanger 30 for heat exchange between the heat from the reactor 3 and the drain water flowing through the circulation channel C. In this way, the temperature rise in the reactor 3 may be suppressed by heat exchange with the drain water flowing through the circulation channel C.

At this time, it is also possible to provide a fourth bypass channel L bypassing the fifth heat exchanger 30 in the circulation channel C and a flow control valve 31 for controlling the flow rate of the drain water fed to the fifth heat exchanger 30 in the fourth bypass channel L. This allows the temperature in the reactor 3 to be maintained at a value appropriate for the reaction.

The method for consuming the reaction heat generated in the reactor 3 is not limited to the heat exchange with the drain water described above; for example, it may be subjected to heat exchange with the makeup water flowing through the third channel F.

{Second Embodiment}

Figure 6:
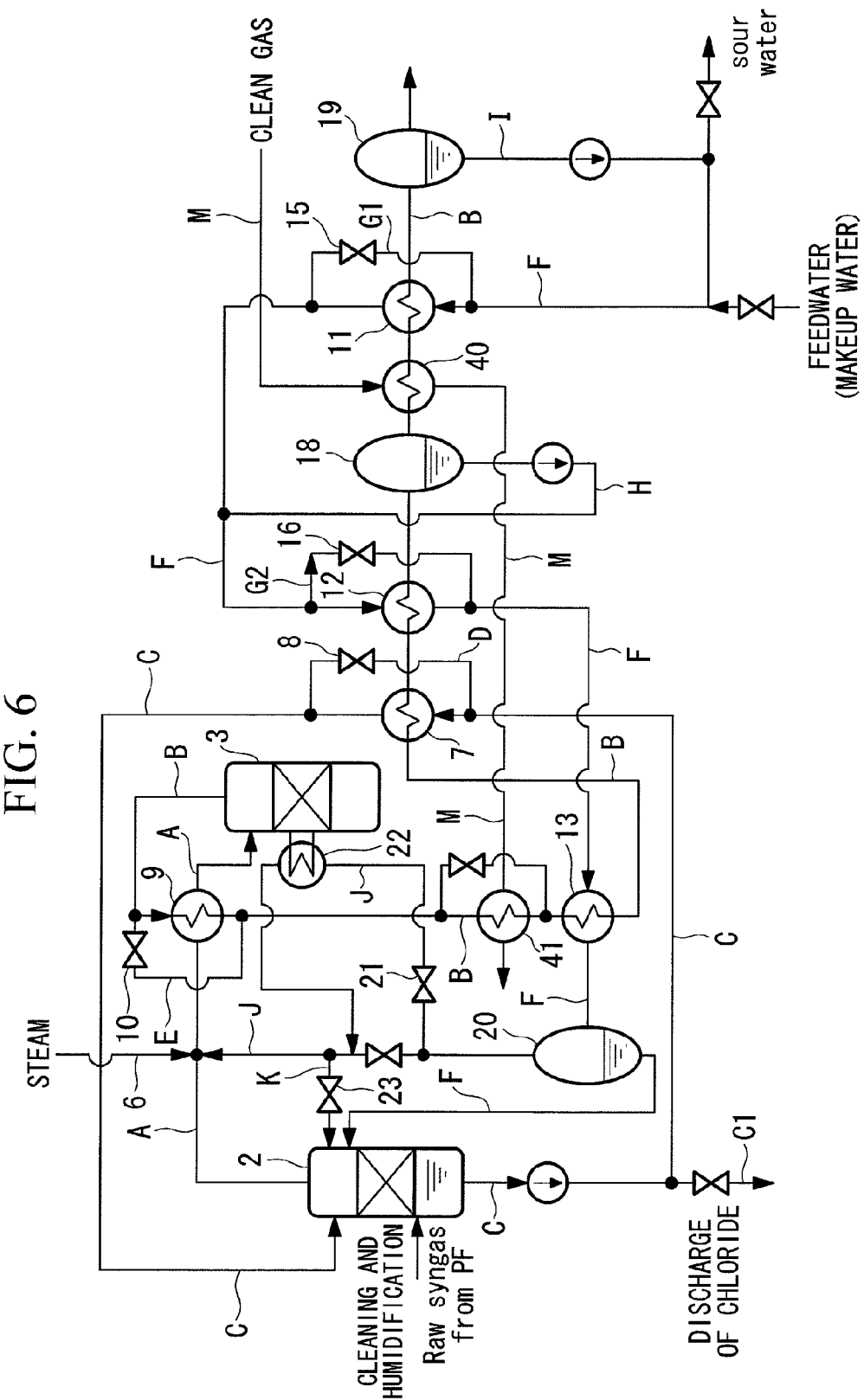
FIG. 6 is a diagram schematically showing the configuration of a hydrogen production system according to a second embodiment of the present invention.

Next, a second embodiment of the present invention will be described with reference to FIG. 6.

A hydrogen production system of this embodiment differs from that of the first embodiment in that a sixth channel M through which a clean gas flows is provided, where the clean gas is the process fluid fed from the hydrogen production system shown in FIG. 1 to downstream equipment in which carbon dioxide is removed therefrom; that the sixth channel M and the second channel B intersect at one or more positions; and that sixth heat exchangers 40 and 41 are provided at the respective intersections.

In this way, the sixth heat exchangers 40 and 41 can be provided for heat exchange with the process fluid produced in the equipment disposed downstream of the hydrogen production system to more effectively utilize the heat generated in the reactor 3.

{Reference Signs List}

1 hydrogen production system
2 humidifier
3 reactor
7 first heat exchanger
8 first flow control valve
9 second heat exchanger
10 second flow control valve
11, 12, 13 third heat exchanger
15, 16 third flow control valve
18, 19, 20 vapor-liquid separator
21 third flow control valve
22 fourth heat exchanger
23 fourth flow control valve
30 fifth heat exchanger
31 flow control valve
40, 41 sixth heat exchanger
101 gasifier
102 desulfurization equipment
103 hydrogen production equipment
104 carbon dioxide capture equipment
105 power generation equipment
A first channel
B second channel
C circulation channel
D first bypass channel
E second bypass channel
F third channel
G1, G2 third bypass channel
H, I pipe
J fourth channel
K fifth channel
L fourth bypass channel

The invention claimed is:

1. A hydrogen production system comprising:
a humidifier that is supplied with a process fluid containing carbon monoxide and that mixes the process fluid with steam;

a reactor that allows the humidified process fluid output from the humidifier to react in the presence of a catalyst to transform the carbon monoxide in the process fluid into carbon dioxide;

a first channel through which the humidified process fluid is supplied from the humidifier to the reactor;

a second channel through which the high-temperature process fluid that has reacted in the reactor flows;

a circulation channel through which excess water in the humidifier is circulated;

a first heat exchanger, disposed at an intersection of the circulation channel and the second channel, for heat exchange between the high-temperature process fluid that has reacted in the reactor and the fluid circulated through the circulation channel;

a third channel through which makeup water is supplied to the humidifier;

a third heat exchanger, disposed at an intersection of the third channel and the second channel, for heat exchange between the high-temperature reacted process fluid and the makeup water flowing through the third channel;

a separator disposed in the third channel to separate the fluid flowing through the third channel into water and steam; and a fourth channel through which the steam separated by the separator is supplied to the first channel;

wherein the third channel and the second channel intersect at a plurality of positions, the heat exchanger being disposed at each intersection.

2. The hydrogen production system according to claim 1, further comprising:
   a first bypass channel branched off the circulation channel so as to bypass the first heat exchanger; and
   a first flow control valve disposed in the first bypass channel to control the flow rate of the fluid fed to the first heat exchanger.

3. The hydrogen production system according to claim 1, further comprising:
   a second heat exchanger, disposed at an intersection of the first channel and the second channel, for heat exchange between the process fluid from the humidifier and the high-temperature reacted process fluid output from the reactor.

4. The hydrogen production system according to claim 3, further comprising:
   a second bypass channel branched off the second channel so as to bypass the second heat exchanger; and
   a second flow control valve disposed in the second bypass channel to control the flow rate of the high-temperature reacted process fluid fed to the second heat exchanger.

5. The hydrogen production system according to claim 1, further comprising:
   a third flow control valve disposed in the fourth channel to control the flow rate of the steam supplied to the first channel.

6. The hydrogen production system according to claim 1, further comprising:
   a fourth heat exchanger disposed in the fourth channel to heat the steam flowing through the fourth channel with heat generated in the reactor.

7. The hydrogen production system according to claim 1, further comprising:
   a fifth channel branched off the fourth channel to supply a portion of the steam flowing through the fourth channel to the humidifier.

8. The hydrogen production system according to claim 7, further comprising:
   a fourth flow control valve disposed in the fifth channel to control the amount of steam supplied to the humidifier.

9. The hydrogen production system according to claim 2, wherein the degree of opening of the first flow control valve and the degree of opening of a fourth flow control valve disposed in a fifth channel branched off the fourth channel to supply a portion of the steam following through the fourth channel to the humidifier and to control the amount of steam supplied to the humidifier are controlled on the basis of an atmospheric temperature in the humidifier.

10. The hydrogen production system according to claim 9, wherein the degree of opening of the fourth flow control valve is increased until the temperature in the humidifier reaches a saturation temperature if the temperature in the humidifier does not reach the saturation temperature after the first flow control valve is fully closed in a state that the fourth flow control valve fully closed.

11. The hydrogen production system according to claim 1, further comprising:
   a discharge channel branched off the circulation channel to release a portion of the fluid flowing through the circulation channel to the outside.

12. A power generation system comprising the hydrogen production system according to claim 1.

13. The power generation system according to claim 12, further comprising:
   a steam turbine; and
   a sixth channel through which a portion of high-pressure or medium-pressure steam supplied to the steam turbine is supplied to the first channel.

* * * * *